United States Patent

Miller

[15] 3,680,305
[45] Aug. 1, 1972

[54] CLEAN COMBUSTION ENGINE SYSTEM

[72] Inventor: Raymond S. Miller, 840 E. Foothill Blvd., #109, Azusa, Calif. 91702

[22] Filed: Sept. 28, 1970

[21] Appl. No.: 76,037

[52] U.S. Cl. ................60/13, 123/32, 123/32 ST, 123/65 VA, 123/65 BA, 123/73 CC, 123/119 C
[51] Int. Cl. ..............................................F02k 23/14
[58] Field of Search.........123/32, 32 ST, 65 R, 65 A, 123/65 B, 65 V, 65 VA, 65 VS, 69 R, 73 CC, 73 CB, 73 CA; 60/13

[56] References Cited

UNITED STATES PATENTS

| | | |
|---|---|---|
| 3,363,611 | 1/1968 | Von Seggern et al.......123/65 A |
| 1,413,213 | 4/1922 | Badger............................123/65 |
| 2,473,164 | 6/1949 | McCoy ........................123/65 V |
| 2,583,651 | 1/1952 | Horning, Jr.......................60/13 |
| 2,654,991 | 10/1953 | Nettel...............................60/13 |
| 2,865,164 | 12/1958 | Kauffmann.....................123/65 |
| 2,916,023 | 12/1959 | Sanborn......................123/65 X |

*Primary Examiner*—Laurence M. Goodridge
*Attorney*—Boniard I. Brown

[57] ABSTRACT

A clean combustion engine system having a two cycle engine vehicle is supplied near the end of each power stroke with an initial charge of pure air for purifying and cooling the engine cylinder and a following fuel-air charge which enters the cylinder in a manner that achieves efficient combustion during the next power stroke. Air is supplied to the engine through a large plenum chamber from a compressor powered by the engine. Fuel flow to the engine is regulated by a carburetor throttle valve and a timing valve which opens and closes in timed relation to the reciprocating motion of the engine piston. Air flow to the engine is regulated by an air valve operated by a governor in response to both throttle valve setting and engine speed.

6 Claims, 6 Drawing Figures

INVENTOR
RAYMOND S. MILLER
BY
ATTORNEY

INVENTOR
RAYMOND S. MILLER
BY
ATTORNEY

CLEAN COMBUSTION ENGINE SYSTEM

BACKGROUND OF THE INVENTION

1. Field of the Invention

This invention relates generally to the field of internal combustion engines and more particularly to a clean combustion engine system.

2. Discussion of the Prior Art

It is now well recognized that exhaust emissions from automotive vehicles constitute a major source of air pollution, or smog as it is commonly referred to. The major contaminants present in engine exhaust gas are oxides of nitrogen, which provide the visual indicator of smog, unburned hydrocarbons, and carbon monoxide. The presence of these contaminants in the exhaust is due to various causes. Hydrocarbon emissions, for example, arise from fuel and unburned fuel-mixtures discharged from cylinders by exhaust valve leakage and spark ignition failures. Carbon particles, the basic cause of both troubles, are formed in the combustion chamber by residues from unburned fuel. These particles, being heavier than the gases, are contained in the last gases discharged from the cylinder as the exhaust valves close. Thus, some particles can prevent complete valve closure and permit fuel mixture to escape into the exhaust passage when the cylinder gas is compressed. Moreover, the valves of the modern internal combustion engines do not permit a purging of all exhaust gases from cylinder chambers on every cycle, so residues of heavier gases and liquid or solid particles remain in the cylinders for many cycles and accumulate as unburned carbon deposits. Some deposits are trapped on exhaust valve seats to prevent perfect valve closure and permit the emission of hydrocarbon fumes into the exhaust passages during the compression and firing strokes.

Carbon monoxide emissions arise from an incomplete combustion of the fuel mixture, which results from the complex problems of fuel-metering, vaporization, and mixture with air in the few hundredths of a second available from carburetor to ignition firing. Modern internal combustion engines compound the fuel mixture problem by variations in passages to different cylinders, heat admission, and pulsation of fuel mixture flow with the variations required for speed and power controls.

In order to control such hydrocarbon and carbon monoxide emissions, present day internal combustion engines are designed to have high compression ratios and resulting high operating temperatures. These high operating temperatures aid fuel combustion and thereby reduce hydrocarbon and carbon monoxide emission. However, such high operating temperatures also result in the formation of the nitrogen oxides referred to earlier.

Prior art U.S. Pat. Nos. 888,374; 973,792; 1,486,427; 1,575,541; 1,654,156; 1,677,057; 1,686,236; 1,732,578; 1,786,106; 1,813,730; 2,068,878; 2,290,265; 2,383,336 and 2,470,702 disclose improved engine systems of the general class of the engine of the present invention discussed above. Generally speaking, these engine systems are characterized by means for purging the exhaust gases from the engine cylinders after each cylinder combustion and inject a new fuel charge for the next power stroke. An excess quantity of purge air prevents carbon build-up in the cylinder for more efficient combustion during each combustion cycle. The purged air also cools the cylinder walls, thus reducing or eliminating the formation of nitrogen oxides and the external engine cooling requirements.

SUMMARY OF THE INVENTION

The present invention provides an improved engine system, herein referred to as a clean combustion engine (CCE) system, of the general class disclosed in the patents listed above. This engine system embodies a two-cycle internal combustion engine with intake and exhaust ports opening through the walls of the engine cylinder in a manner such that near the end of each power stroke, the engine piston initially uncovers the exhaust port and then the intake port. The engine drives an air compressor which delivers air under pressure to the intake port through two conduits referred to herein as air and fuel conduits, respectively. Contained within the air conduit is an air valve for regulating air flow to the engine. The fuel conduit contains a carburetor for mixing fuel with the air flowing through the conduit and a timing valve which opens and closes in timed relation to the reciprocating motion of the engine piston to admit a fuel-air charge to the engine at proper time during each piston power stroke.

During engine operation, the piston first uncovers the cylinder exhaust port to vent exhaust gas from the cylinder as the piston nears the end of each power stroke. Shortly after uncovering the exhaust port, the piston uncovers the intake port to admit a charge of pure air to the combustion chamber to purge the chamber of all combustion residue. The fuel timing valve opens immediately after purging of the chamber to admit to the chamber a fuel-air charge for combustion during the next piston power stroke.

According to one feature of the invention, the engine air compressor may be either a positive displacement pump which is driven directly from the engine crankshaft or, according to the preferred practice, a rotary compressor driven by a turbine which is powered by the hot exhaust gas from the engine. This turbine may also drive an electrical generator for the engine ignition system and may be arranged to complete combustion of any unburned fuel in the engine exhaust. The turbine also muffles the engine exhaust, thus eliminating the need for a conventional engine exhaust muffler.

According to another feature, the air conduit of the engine system contains an enlarged plenum chamber whose volume exceeds the air volume consumed by the engine during intake. This plenum provides, in effect, an air accumulator for assuring proper air supply to the engine at all engine speeds. When an engine design contains three or more cylinders supplied by a single compressor, the plenum chamber size can be reduced to an appropriate sized manifold.

Another feature of the engine system concerns adjustment of the engine air valve in response to changing engine loads and throttle valve settings. According to this feature, the engine system is equipped with a governor driven from the engine and operatively coupled to the air valve and carburetor throttle valve. When the throttle valve setting is changed to increase or reduce fuel flow to the engine, the governor operates to adjust the air valve to a position related to the new throttle valve setting in response to changing engine speed so as to increase or decrease, as the case may be, the air flow to the engine to provide the correct fuel air ratio at the new throttle valve setting. This governor controlled air valve provides, in effect, a delayed action which enriches the fuel-air mixture during abrupt acceleration to provide additional acceleration power and leans the mixture during abrupt deceleration to reduce exhaust emission of unburned fuel. The fuel timing valve may also embody an adjustable valve element operated by the governor for altering the timing and duration of each fuel-air charge to the engine in response to engine speed.

According to a further feature of the invention, the fuel is admitted to the engine in a unique manner which assures efficient combustion over the entire engine operating range, particularly at lean fuel-air ratios.

DESCRIPTION OF THE PREFERRED EMBODIMENT

Figure 1:
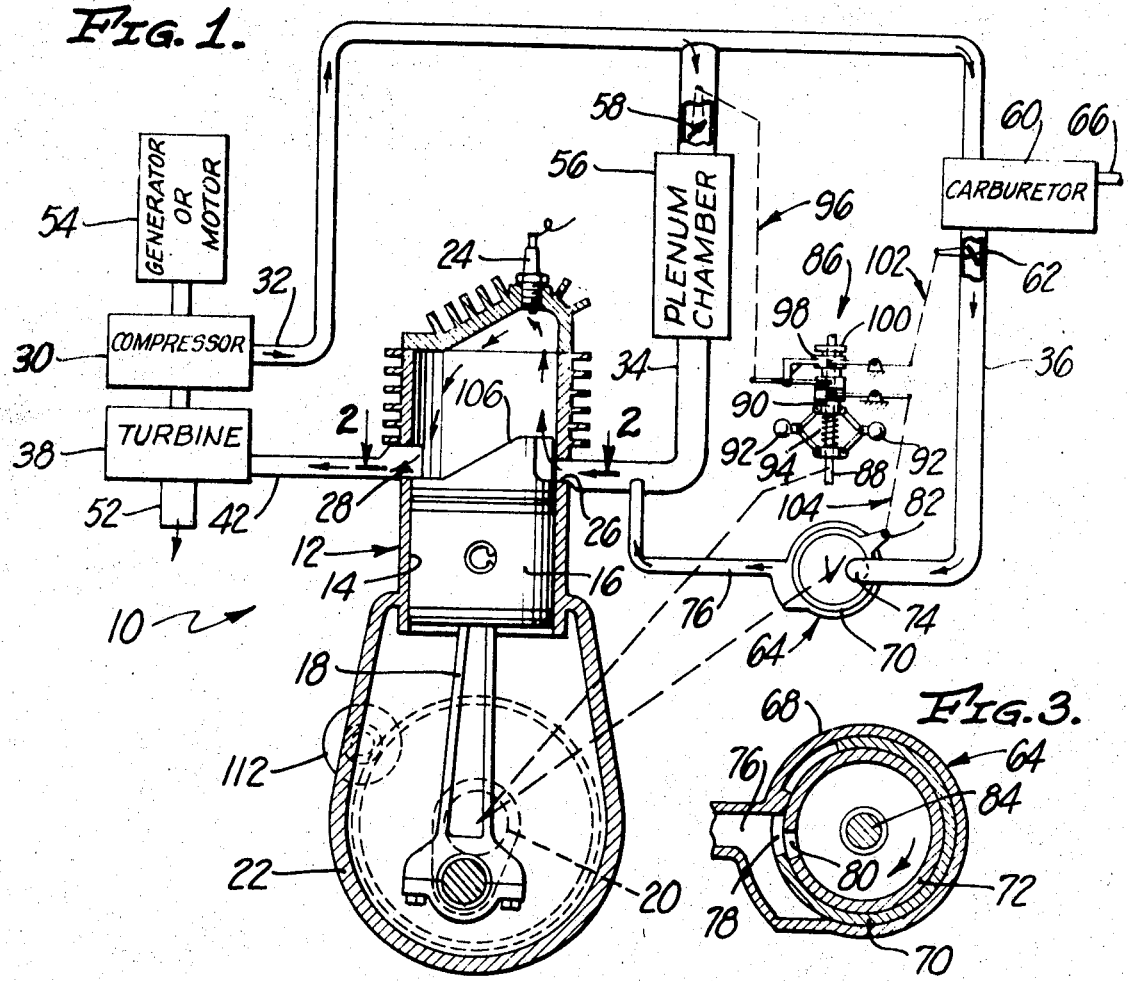
FIG. 1 diagrammatically illustrates a clean combustion engine system according to the invention.

The illustrated engine system 10 comprises a two-cycle internal combustion engine 12 having a cylinder 14 containing a piston 16. The piston rod 18 is connected to a crankshaft 20 within the engine crankcase 22. Mounted in the cylinder head is a spark plug 24. Opening through the cylinder wall are intake and exhaust ports 26, 28. These ports are arranged so that near the end of each power stroke, the piston 16 first uncovers the exhaust port 28 and then the intake port 26.

Figure 5:
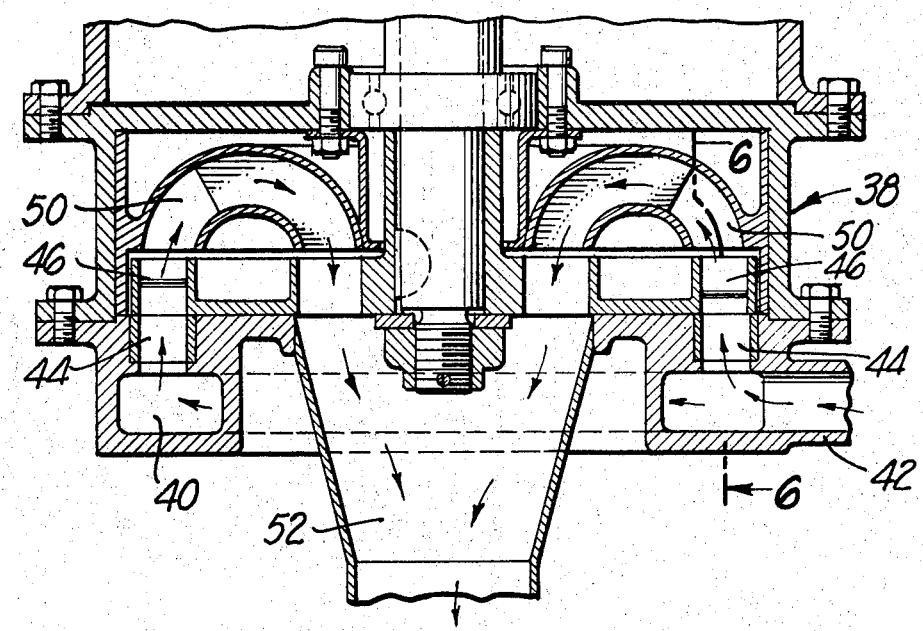
FIG. 5 is a section through the air compressor turbine of the engine system.
Figure 6:
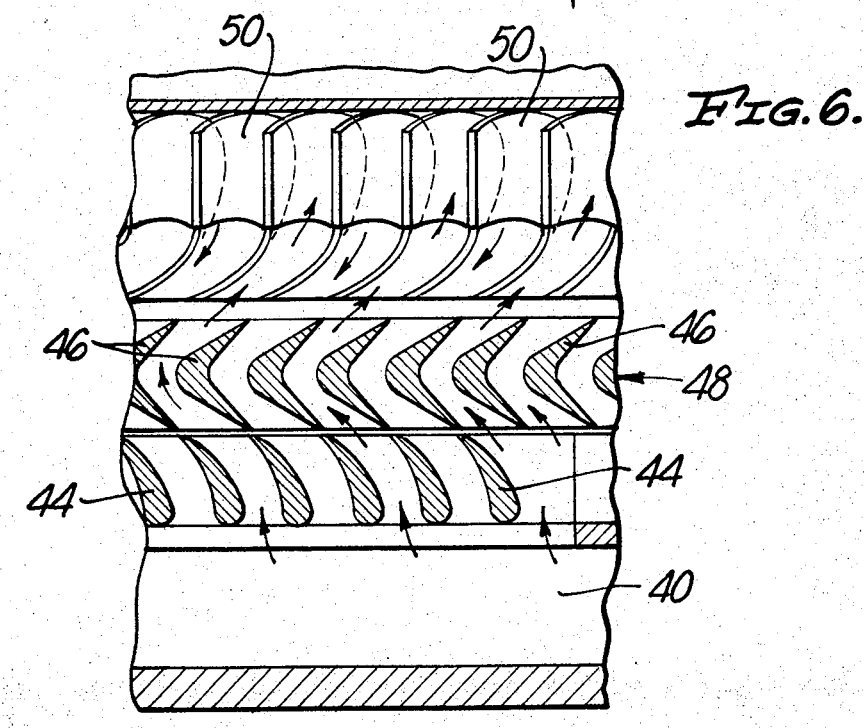
FIG. 6 is a section taken on line 6—6 in FIG. 5.

A compressor 30 driven from the engine 12 has an outlet 32 communicating to the engine intake port 26 through two conduits 34 and 36, hereafter referred to as air and fuel passages, respectively. In this instance, the compressor is a rotary compressor drivably coupled to a turbine 38 powered by the exhaust gas from the engine 12. Referring to FIGS. 5 and 6, it will be seen that turbine 38 has an annular inlet manifold 40 communicating through an exhaust conduit 42 with the engine exhaust port 28. The exhaust gas entering the manifold 40 from the engine exits from the manifold through a set of stationary turbine vanes 44 which direct the gas against the vanes 46 of a rotor 48 to drive the latter, and thereby the rotor of compressor 30, in rotation. The exhaust gas emerging from the rotor 48 enters arcuate passages 50 which curve back through the rotor and then open to a common exhaust passage 52.

From this description it will be understood that the turbine 38 defines tortuous passages through which exhaust gas flows from the engine 12 to the turbine exhaust passage 52. These tortuous passages serve a twofold purpose. First, the passages induce turbulence of the exhaust gas to promote mixing of the gas and air and combustion of any unburned fuel in the gas. Secondly, the passages muffle the engine exhaust noise and thus eliminate the need for a conventional engine exhaust muffler. It is further evident, of course, that the turbine 38 converts at least a portion of the waste heat content of the exhaust gas to energy for compressing the engine intake air.

According to a feature of the invention, the turbine 38 may also drive an electrical generator 54 for the engine ignition system. When starting the engine, the generator 54 may be operated as a motor for driving the compressor. Alternatively, a separate motor may be coupled to the compressor for driving the latter during engine start up.

Within and forming a part of the air conduit 34 is an enlarged plenum chamber 56. An air flow regulating valve 58 is located within the air conduit 34 at the upstream end of the plenum chamber. This valve is shown to be a butterfly valve which is rotatable to regulate air flow through the air conduit.

Within the fuel conduit 36 is a carburetor 60, a throttle valve 62, and a fuel timing valve 64. Carburetor 60 has a fuel inlet line 66 through which fuel enters the carburetor from a fuel supply (not shown) for mixing with the air flowing through the carburetor. The fuel timing valve 64 has a housing 68 containing an outer rotatably adjustable valve sleeve 70 and an inner rotary valve sleeve 72. The valve housing 68 has an inlet port 74 communicating with the outlet of carburetor 60 and an outlet port 76 communicating to the air conduit 34, just upstream of the engine intake port 26.

Figure 3:
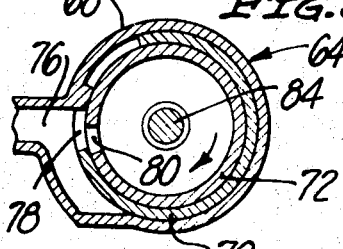
FIG. 3 is a section through the fuel timing valve of the engine system.

The valve sleeves 70, 72 have ports 78, 80, respectively. As shown best in FIG. 3, the valve body and outer valve sleeve ports 76, 78 have the same circumferential extent which is substantially greater than that of the inner valve sleeve port 80. The outer valve sleeve 70 is rotatably adjustable to vary the overlap area of the ports 76, 78 and hence the effective area of the outer valve sleeve port 78. The inner valve sleeve port 80 registers with the outer sleeve port 78 once during each revolution of the inner sleeve.

Attached to the outer valve sleeve 70 is a radial arm 82 for rotating the inner sleeve. Coaxially fixed to the inner valve sleeve 72 is a shaft 84 which is drivably coupled to the engine crankshaft 20 for rotation in timed relation to the crankshaft rotation.

A governor 86, driven from the engine 12, adjusts the air valve 58 in response to engine speed and the setting of throttle valve 62. The particular governor shown is a centrifugal governor having a shaft 88 drivably connected to the engine crankshaft 20. Slidable on the shaft is a spool 90 which is positioned axially by the combined action of centrifugal weights 92 and a spring 94. Spool 90 is operatively connected to the air valve 58 by linkage 96 in a manner such that increasing engine speed opens the valve. Slidable on spool 90 is a sleeve 98 from which the linkage 96 is pivoted. Sleeve 98 is connected through linkage 102 to the carburetor throttle valve. As is readily evident from the drawing, opening movement of the throttle valve moves the sleeve 98 in a direction to decrease the air valve opening, and thus decrease the purge air pressure. Closing movement of the throttle valve moves the sleeve 98 in a direction to increase the air valve opening and thus increase the purge air pressure. The governor spool 90 may also be connected through linkage 104 to the outer timing valve sleeve 70 in a manner such that increasing engine speed rotates the sleeve 70 in a direction to increase the open time of the timing valve 64.

Figure 2:
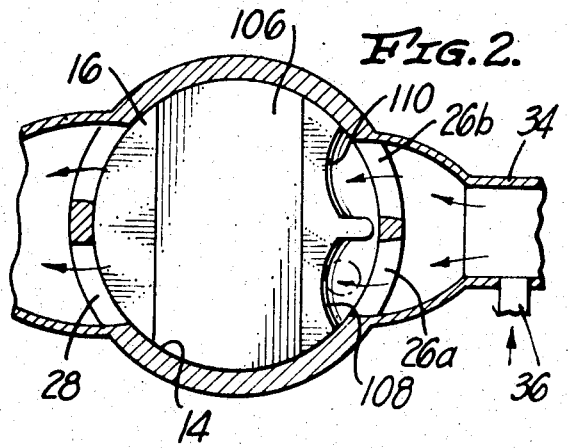
FIG. 2 is an enlarged section taken on line 2—2 in FIG. 1.

According to a feature of the invention, the engine intake port 26 is divided into two openings 26a, 26b arranged side by side circumferentially of the cylinder 14. The piston 16 has a top deflector 106 having two cavities 108, 110 which open laterally and upwardly and register with the intake port openings 26a, 26b, respectively, when the piston is at and near its lower position. As shown best in FIG. 2, the spark plug 24 is located directly over the deflector cavity 108, and the fuel conduit 36 opens to the same side of the air conduit 34 as the deflector cavity 108 and intake port opening 26a.

In operation, the engine 12 is started by a starter motor 112 geared to the engine crank shaft 20. The air compressor turbine 38 is driven by the generator 54 or a separate motor, such as the starter motor 112. After starting, the turbine is powered by the exhaust gas from the engine. The compressor 30 driven by the turbine delivers air under pressure to the engine intake port 26 through the air and fuel conduits 34, 36. The fuel supplied to the carburetor 60 through the fuel line 66 mixes with the air passing through the carburetor to provide a fuel-air mixture, which is periodically admitted to the engine by the fuel timing valve.

During each downward power stroke of the engine piston 16, the latter initially uncovers the exhaust port 28 and then the intake port 26 as the piston nears the end of the stroke. Initial opening of the intake port admits a charge of pure air to the combustion chamber to purge the combustion residue from the chamber. In this regard, it will be seen that the piston deflector 106 deflects the entering purge air upwardly to the top of chamber to sweep the latter clean. The fuel timing valve 64 is timed to open to admit a fuel-air charge to the engine immediately after admission of the initial purge air charge. The piston deflector 106 deflects the entering fuel-air charge upwardly to the spark plug 24 to promote relatively complete combustion of the charge. In this latter regard, it will be noted that since the fuel-air charge enters the side of the air conduit 34 adjacent the intake port opening 26a, a major portion of or the entire charge enters the cylinder 14 through the latter port opening and is deflected up to the spark plug 24 by the directly underlying deflector cavity 108. This assures optimum fuel combustion over the entire engine operating range, particularly at lean fuel-air ratios.

Figure 4:
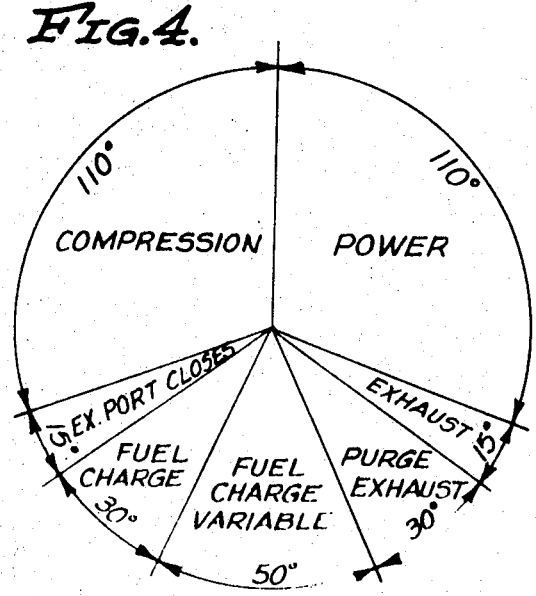
FIG. 4 is a timing diagram of the engine system.

FIG. 4 illustrates a timing diagram of a typical engine cycle. It is significant to note, however, that the cycle degrees indicated in the diagram are illustrative only and may vary in accordance with different engines, power requirements, operating speeds, etc.

The governor 86 positions the air valve 58 in response to engine speed and the setting of the throttle valve 62 to provide the correct fuel-air ratio over the entire engine operating range. In this connection, it is significant to note that the air valve movement is occasioned by changing engine speed and modified by the throttle valve adjustment. As a consequence, when the throttle valve 62 is opened to supply more fuel to the engine 12, the air valve 58 is closed slightly, increasing the fuel charge to the cylinder for increased power, until the engine speed increases. Any increase in engine speed increases the opening of air valve 58 to decrease the fuel charge for control of the desired power and speed to any requirement. A reverse action occurs when the throttle valve 62 is closed to reduce the fuel to the engine. In this case the air valve 58 is opened to increase the air purge and decrease the amount of fuel charge delivered to the engine, so as to minimize exhaust emission of unburned fuel. Adjustment of the timing valve sleeve 70 in response to engine speed increases the fuel to the engine for more power as the engine speed increases and reduces the fuel flow as the engine speed decreases. As noted earlier, the governor controlled valving of the engine system is adjusted to provide the proper fuel-air ratio over the entire range of engine operation.

The illustrated turbine driven compressor arrangement for supplying induction air to the engine 12 is preferred for the reasons that it muffles the engine exhaust noise and converts some of the waste heat in the exhaust gas to energy for compressing the induction air. As noted earlier, however, the engine system may utilize a positive displacement compressor mechanically driven from the engine. Moreover, while the illustrated engine system has a single cylinder engine, the system may obviously utilize an engine with any number of cylinders. In such a multi-cylinder engine, the fuel timing valve 64 is modified to admit fuel-air charges to all the cylinders in the proper timing and sequence. When an engine design contains three or more cylinders supplied by a single compressor the plenum chamber size can be reduced to an appropriate sized manifold.

It will now be evident that the present clean combustion engine system possesses many advantages over a conventional internal combustion engine. These advantages may be summarized as follows:

Cylinder wall porting of the clean combustion engine system provides a full discharge of the heavier particles by the air purge, and sliding valve seals prevent leakage during fuel mixture compression.

Simplification of fuel mixture flow under pressure controls provides a uniform fuel-mixture to all cylinders, and after combustion in the power stroke any incompletely burned fuel is mixed with additional heated air in the turbine to provide complete combustion and eliminate carbon monoxide emission.

The engine system provides a pressurized air purge of all combustion gases and particles from the cylinder on every cycle, to prevent accumulations or deposits. Also, this air purge absorbs heat from the inner cylinder wall to expand the air and provide heated air in the turbine mixing chamber to complete the combustion of any incompletely burned fuel gases or particles.

Conventional internal combustion engines use higher compression ratios to produce high pressures and temperatures which aids the combustion of fuel, but these combustion temperatures and pressures produce an increased emission of nitrogen oxides. The higher cylinder pressures increase the bearing loads, but the cylinder pressures decrease so rapidly with piston travel that the engine torque is increased only 4 percent by a compression ratio change from 8:1 to 10:1 with cylinder charge pressure at 15 psia or less. The present engine system provides cylinder charge pressures above atmospheric pressure; so, the torque (117 ft. lbs.) obtained from 10:1 compression ratio with 15 psia cylinder charge-pressure (1,235 psia combustion pressure) can be obtained (116 ft. lbs.) at 5:1 compression ratio with 627 psia combustion pressure from 20 psia cylinder charge-pressure, or (117 ft. lbs.) at 4:1 compression ratio with 578 psia combustion pressure from 25 psia cylinder charge-pressure. Thus, the engine system can produce equal engine torque from combustion pressures 50 percent lower to reduce nitrogen oxide emissions, with the cylinder air purge eliminating the production of hydrocarbon and carbon monoxide emissions.

Conventional internal combustion engines use approximately 62 percent of the engine revolutions to discharge exhaust gases and recharge the cylinders with fuel mixture by piston action, using atmospheric pressure (15 psia) to charge the cylinders through restrictions of air cleaners, manifold passages and valve porting. The present engine system uses high pressure air to purge the exhaust gases from the cylinder through large ports in the cylinder wall, with the fuel mixture following to supply the new charge at 20 to 30 psia. The rotary air compressor provides a continuous flow of pressurized air, with its power extracted from the flow and expansion of the exhaust gases and heated purging air.

Conventional internal combustion engines use mufflers to reduce the barking noise of the high pressure exhaust porting, while the present engine system smooths out the exhaust discharge in the turbine drive of the air compressors and electric generator. Energy which is lost in the exhaust is put to work to drive the air compressor for exhausting and recharging the cylinders. The cylinder purge and fuel charging requires 62 percent of the engine revolutions, but is obtained in a third the time using a continuous flow of pressurized air.

Conventional internal combustion engines use 30 percent of the compression stroke to obtain 30 psia cylinder pressure, which is provided by the present engine system from energy obtained from the exhaust gases. Also, to obtain compression pressures required for efficient combustion of the fuel, the compression pressure of conventional internal combustion engines is 78 percent higher (1,235/691) than the present engine system with 30 psia charge pressure. Higher compression ratios cause the cylinder pressures to drop more rapidly, so the present engine system with 4:1 compression and 30 psia charge pressure produces 30 percent more engine torque (153/117) than conventional internal combustion engines with 10:1 compression and 15 psia charge pressure.

Conventional internal combustion engines use two crankshaft revolutions to produce a power stroke, while the present engine system produces a power stroke on every revolution. Thus the number of revolutions or the number of cylinders and engine friction losses is cut in half with the present engine system.

Conventional internal combustion engines retain the hot combustion gases in the cylinder for a complete shaft revolution, while the present engine system discharges these gases in half this time, so heat lost to the cylinder chamber walls is reduced, and the purge air absorbs heat from the chamber inner walls to reduce the heat lost to the cooling system. Also, the present engine system uses heat from the inner chamber walls for air expansion and full fuel combustion in the turbine chambers for maximum power recovery from the fuel consumed.

The present engine system requires very little power for rotation of the fuel mixture control valve, much less than that required to drive the cam shaft and valve mechanism on conventional internal combustion engines, so engine efficiency of the present engine system can be nearly double that obtained by conventional internal combustion engines.

The present engine system uses half the crank revolutions and cylinders to produce more engine torque, which shortens the crankshaft and engine assembly, reducing the original and maintenance costs.

Conventional internal combustion engines use a complicated cam shaft and poppet valves for porting of the gases, while the present engine system uses simple cylinder wall porting with compressed air for exhaust purging and cylinder fuel recharging. The present engine system requires a turbine and air-compressor not used on conventional internal combustion engines, but after production bugs are worked out, the cost of turbine, air-compressor, and fuel mixture valve with controls should not be much more than the cost of cam shaft, valves, and cylinder head complications on conventional internal combustion engines.

With the number of cylinders reduced in the present engine system, the ignition distributor may be simplified.

The present engine system porting valve problems will be reduced by the simplified porting and controls of the system, thus reducing maintenance costs.

Exhaust gases as emitted from the turbine will have the pressure pulses dampened, so a simple expansion tube may replace the muffler, and the current air pollution control adaptations will no longer be required.

When the present engine system is in production its cost would be considerably less than conventional internal combustion engines.

Engine speed and power of the present engine system is controlled not only by the carburetor valve opening, but also by the pressure of the purge air and fuel mixture relationship, and further by the duration and timing of fuel mixture entrance to the cylinders. Also, the general engine performance is determined by the cylinder port size, shape, and relative opening and closing cycle, so all types of engine applications can be accommodated by selection of operation pressures and controls, and cylinder porting.

Automobiles which require a wide range of speed and power operation can use a range of charging pressures (20 to 40 psia) which with 100 cubic inch displacement can provide maximum torques ranging from 103 to 203 ft. lbs., with fractional loads controlled by the volume and timing of fuel mixture admission.

Racing and aircraft applications of the present engine system can use a higher range of charging pressures (30 to 60 psia) to obtain increased power and speed, with the higher exhaust discharge pressures providing the additional power required for air compression.

Truck, bus, farm equipment, and industrial applications of the present engine system can use the lower range of charging pressures (20 to 25 psia) to obtain more conservative power for continuous duty with minimum maintenance and repair costs.

With the present engine system the fuel mixture pressure and volume charge provided to the cylinders determines the engine speed and power performance. The controls can be developed to provide either the maximum power, or maximum power efficiency with a minimum of air pollution to contaminate the environment.

What is claimed as new in support of Letters Patent is:

1. A clean combustion engine system comprising:
a two-cycle internal combustion engine including a cylinder, a piston movable in said cylinder, and intake and exhaust ports opening through the cylinder wall in positions such that said piston initially uncovers said exhaust port and thereafter said intake port near the conclusion of each power stroke of the piston,
means including an air conduit for supplying air under pressure to said intake port,
means including a fuel conduit for supplying fuel-air mixture to said intake port,
timing valve means in said fuel conduit operatively connected to said piston for regulating fuel flow to said intake port in timed relation to the reciprocating motion of said piston, such that said cylinder receives an initial charge of pure air for purging said cylinder and thereafter a fuel-air mixture for combustion in said cylinder during each opening of said intake port; and
said valve means comprising a rotary valve sleeve driven in rotation in timed relation to the reciprocating motion of said piston, a second rotatably adjustable valve sleeve about said first valve sleeve, a body about said second sleeve, ports in said sleeves and body which register during each revolution of said first sleeve to pass fuel to said engine, said second sleeve and body ports being circumferentially elongated relative to the first sleeve port, and means for rotatably adjusting said second valve sleeve to adjust the effective circumferential length of its port registering with the body port.

2. A clean combustion engine system comprising:
a two-cycle internal combustion engine including a cylinder, a piston movable in said cylinder, and intake and exhaust ports opening through the cylinder wall in positions such that said piston initially uncovers said exhaust port and thereafter said intake port near the conclusion of each power stroke of the piston,
means for supplying air under pressure to said intake port including an air compressor driven by said engine and having an outlet, and an air conduit communicating said outlet and intake port and defining a plenum chamber for containing a charge of air substantially exceeding the volume of air consumed in said cylinder during each combustion stroke of said piston,
a fuel conduit communicating said outlet and intake port in parallel relation with said air conduit, a carburetor, throttle valve, and timing valve in said fuel conduit,
an air valve in said air conduit for regulating air flow to said engine,
a governor driven by said engine at a speed related to the engine speed,
means connecting said governor, throttle valve, timing valve, and air valve for periodically supplying a regulated fuel charge to said intake port in timed relation to the reciprocating motion of said piston in a manner such that said cylinder receives an initial charge of pure air for purging the cylinder and thereafter a fuel-air mixture for combustion in said cylinder during each opening of said intake port, and positioning said air valve in response to both engine speed and throttle valve setting in a manner such that opening said throttle valve to a given setting to increase fuel flow to said engine effects opening of said air valve by said governor in response to increasing engine speed and engine power requirements, and closing of said throttle valve to a given setting to reduce fuel flow to said engine effects closing of said air valve in response to decreasing engine speed, in accordance with power or speed control requirements.

3. An engine system according to claim 1 wherein:
the volume of said plenum chamber substantially exceeds the volume of air admitted to said cylinder during each stroke of said piston.

4. An engine system according to claim 1 wherein:
said timing valve includes a rotary valve speed driven in rotation in timed relation to engine speed, a second rotatably adjustable valve sleeve about said first valve sleeve, a body about said second sleeve, ports in said sleeves and body which register during each revolution of said first sleeve to pass fuel to said engine, said second sleeve and body ports being circumferentially elongated relative to the first sleeve port, and means for rotatably adjusting said second valve sleeve to adjust the effective circumferential length of its port registering with the body port.

5. An engine system according to claim 4 including:
means operatively connecting said second valve sleeve and governor for adjustment of said second sleeve to increase fuel flow to said engine in response to increasing engine speed.

6. An engine system according to claim 1 wherein:
said intake port has two openings arranged side by side circumferentially of said cylinder,
said fuel conduit opens to said air conduit just before said intake port and at the same side of said air conduit as one of said port openings,
said piston includes a deflector for deflecting toward the cylinder head the air and fuel entering through said port openings, and
said engine includes a spark plug mounted in said head directly over said one port opening.

* * * * *